(12) United States Patent
Brugel

(10) Patent No.: US 6,806,346 B2
(45) Date of Patent: Oct. 19, 2004

(54) COPOLYMERIZATION OF CYCLIC ESTER OLIGOMERS

(75) Inventor: Edward G. Brugel, Wilmington, DE (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 0 days.

(21) Appl. No.: 10/616,168

(22) Filed: Jul. 9, 2003

(65) Prior Publication Data

US 2004/0054124 A1 Mar. 18, 2004

Related U.S. Application Data

(60) Provisional application No. 60/395,557, filed on Jul. 12, 2002.

(51) Int. Cl.$^7$ .......................... C08G 63/12; C08G 63/16
(52) U.S. Cl. ....................... 528/354; 528/355; 528/272; 528/343
(58) Field of Search ................................. 538/354, 355, 538/272, 343

(56) References Cited

U.S. PATENT DOCUMENTS

| | | |
|---|---|---|
| 4,419,507 A | 12/1983 | Sublett |
| 5,039,783 A | 8/1991 | Brunelle |
| 5,214,158 A | 5/1993 | Brunelle |
| 5,466,744 A | 11/1995 | Evans |
| 5,648,454 A | 7/1997 | Brunelle |
| 5,661,214 A | 8/1997 | Brunelle et al. |
| 6,420,047 B2 | 7/2002 | Winckler et al. |

*Primary Examiner*—Duc Truong

(57) ABSTRACT

Chemically different cyclic ester oligomers can be copolymerized to form copolyesters whose properties can be tailored by the choice of cyclic ester oligomers used. The copolyesters formed are especially useful as encapsulants and as coatings. In many instances the copolyesters, assuming they are not randomized in later transesterification reactions, have unique microstructures related to the sequencing of repeat units the their polymer chains.

18 Claims, No Drawings

COPOLYMERIZATION OF CYCLIC ESTER OLIGOMERS

CROSS REFERENCE TO RELATED APPLICATION

This application claims the benefit of U.S. Provisional Application No. 60/395,557, filed Jul. 12, 2002.

FIELD OF THE INVENTION

Mixtures of cyclic ester oligomers derived from different dicarboxylic acids and/or different diols may be copolymerized to form copolyesters. Depending upon the mixture of cyclic ester oligomers chosen, the properties of the resulting copolyester may be tailored for specific applications.

TECHNICAL BACKGROUND

Cyclic ester oligomers (CEOs) have been known for a long time (see for instance U.S. Pat. No. 2,020,298), and it is well known that they can be polymerized to form polyesters (LPEs), see for instance U.S. Pat. Nos. 5,466,744 and 5,661,214 and references cited therein. The CEOs have been of particular interest because they themselves, when melted, are low viscosity liquids which may be readily polymerized to higher molecular weight polymers, for instance in a process similar to reaction injection molding which is commonly used for thermoset resins.

CEOs are typically compounds of the formula

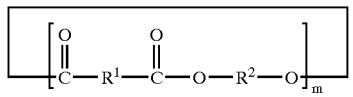

(I)

wherein $R^1$ and $R^2$ are each independently hydrocarbylene or substituted hydrocarbylene, and m is an integer of 1 or more. Herein when m is 1, the compound is a unimer, when m is 2 the compound is a dimer, when m is three the compound is a trimer, etc. Copolyesters (CPEs) are formed when a mixture of two or more compounds (I) wherein $R^1$ and/or $R^2$ are varied is polymerized to form a CPE which contains $R^1$ and $R^2$ groups derived from the compounds (I) which were in the mixture of CEOs. Because the resulting CPE are copolymers, some of their properties are typically different than the properties of their "constituent" "homopolyesters". For example the melting point and/or glass transition temperature and/or heat of fusion of the CPE will typically be different from the constituent homopolyesters.

Random copolyesters derived from terephthalic acid, 1,4-butanediol and diethylene glycol are known, see for instance U.S. Pat. No. 4,419,507 and N. Lotti, et al., Polymer, vol. 41, p. 5297–5304 (2000). Neither of these references describes copolyesters which are not random.

U.S. Pat. Nos. 5,648,454 and 6,420,047 describe the polymerization of certain CEOs in which some of the individual CEO molecules contain groups ("equivalent" to $R^2$ herein) derived from different diols. Groups derived from one of the diols are present in small amounts.

SUMMARY OF THE INVENTION

This invention concerns a process for the copolymerization of cyclic ester oligomers, comprising, contacting under ring opening polymerization conditions a mixture of two or more molten chemically different cyclic ester oligomers of the formula

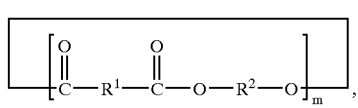

(I)

with a catalyst for the ring opening polymerization of cyclic ester oligomers, to form a copolyester, wherein:

$R^1$ and $R^2$ are each independently hydrocarbylene or substituted hydrocarbylene; and m is an integer of 1 or more; and provided that when every $R^1$ in each molecule of cyclic ester oligomer is not the same and/or every $R^2$ in each molecule of cyclic ester oligomer is not the same, at least two of the chemically different cyclic ester oligomers present are at least 15 mole percent to total amount of cyclic ester oligomers present.

Also disclosed herein is a process for encapsulating or coating an object, comprising, contacting said object with a molten mixture of two or more chemically different cyclic ester oligomers and copolymerizing said molten mixture to form a copolyester which encapsulates or coats said object.

Also disclosed is a copolyester with a degree of randomness of about 0.20 to 0.85.

Described herein is a copolyester wherein single repeat unit blocks of that CEO composition are less than 5 mole percent of those units.

DETAILS OF THE INVENTION

Herein certain terms are used and some of them are:

By "chemically different cyclic ester oligomers" is meant that two or more oligomers are derived from different dicarboxylic acids and/or diols. They do not include oligomers that differ only in the value of "m", that is CEOs which are dimers, trimers, etc., but are derived from the same dicarboxylic acid(s) and diol(s). If a first single CEO is derived from two different dicarboxylic acids and/or two different diols, then a chemically different CEO must be derived from at least one dicarboxylic acid and/or one diol which is not present in the first single CEO.

By hydrocarbylene herein is meant a divalent radical containing only carbon and hydrogen whose (two) free valences are each single bonds to the same or different carbon atoms. Example of hydrocarbylene groups include p-phenylene, m-phenylene and hexamethylene.

By substituted hydrocarbylene herein is meant hydrocarbylene containing one or more heteroatoms other than carbon and hydrogen, for example halogen, oxygen, and nitrogen. The heteroatoms, which by themselves or with other atoms may form "functional groups" should not substantially interfere with any chemical reactions or processes which the composition containing the functional groups is part of. Useful functional groups include ether, keto, chloro, bromo, thioether, and tertiary amino.

The CEOs which are polymerized herein are made by processes which are known, see for instance U.S. Pat. Nos. 5,039,783, 5,214,158, 5,231,161, and 5,321,117. Oftentimes CEOs, for example those derived from a single dicarboxylic acid and single diol, are obtained as mixtures of cyclic molecules which vary [as in (I)] in "m", the number of "repeat" units in the molecule. The CEOs which are polymerized herein may be cyclics in which m is a single number i.e. the CEO is a (for example) dimer, trimer, etc., or CEOs where m is more than one integer i.e. the CEO is a mixture of (for example) dimer, trimer, etc.

In the chemically different CEOs (for all purposes herein) it is preferred that they are derived from:

(a) A preferred diol is an aliphatic diol, that is a diol in which each hydroxyl group is bound to different alkyl carbon atoms. Other preferred diols include diols of the formula $HOCH_2(CR^3R^4)_qCH_2OH$ or $HO(CH_2CH_2O)_tH$ wherein $R^3$ and $R^4$ are each independently hydrogen or alkyl, and q is 0 or an integer of 1 to 10, or t is an integer of 2 to 20, more preferably all $R^3$ and $R^4$ are hydrogen, and n is 0 or an integer 1 to 4, or t is 2 or 3, and especially preferably n is 0, 1 or 2, or t is 2. Other specific preferred diols include hydroquinone, and bisphenol-A, and combinations thereof.

(b) Preferred dicarboxylic acids (or their derivatives including half-acid esters and diesters) are compounds of the formula $HO_2C(CH_2)_nCO_2H$ wherein n is an integer of 1 to 10, isophthalic acid, substituted isophthalic acids, terephthalic acid, substituted terephthalic acids, and 2,6-naphthalenedicarboxylic acid, and combinations thereof. More preferred carboxylic acids are terephthalic acid and isophthalic acid, and terephthalic acid is especially preferred. Any combination of preferred dicarboxylic acid and preferred diols (above) may form a preferred CEO.

(c) Specific preferred combinations of dicarboxylic acids and diols include terephthalic acid with diethylene glycol [bis(2-hydroxyethyl)ether], ethylene glycol, 1,3-propanediol, 1,4-butanediol, 1,5-pentanediol, and 1,6-hexanediol or a mixture thereof, isophthalic acid with diethylene glycol, ethylene glycol, 1,3-propanediol, 1,4-butanediol, 1,5pentanediol, and 1,6-hexanediol or a mixture thereof, and succinic and/or adipic acid with one or more compounds of the formula $HOCH_2(CR^3R^4)_nCH_2OH$, wherein $R^3$ and $R^4$ are hydrogen or alkyl containing 1 to 4 carbon atoms and n is 0 or an integer of 1 to 10.

A preferred combination of chemically different CEOs for the copolymerization process described herein are any two more the preferred individual CEOs described above. A particularly preferred combination of chemically different CEOs is: a CEO derived from terephthalic acid with any one of ethylene glycol, 1,3-propanediol, or 1,4-butanediol with a CEO derived from terephthalic or isophthalic acid with any one of $HO(CH_2CH_2O)_tH$ wherein t is 2, 3 or 4, more preferably 2; and a CEO derived from terephthalic acid with any one of ethylene glycol, 1,3-propanediol, or 1,4-butanediol with a CEO derived from terephthalic or isophthalic acid with any one of $HOCH_2(CR^1R^2)_qCH_2OH$ wherein $R^1$ and $R^2$ are hydrogen, and q an integer of 6 to 10.

In another preferred form, in each CEO molecule every $R^1$ is the same in each molecule of cyclic ester oligomer, and every $R^2$ is the same in each molecule of cyclic ester oligomer. By this is meant that in each molecule of CEO, every $R^1$ has the same chemical structure, and every $R^2$ has the same chemical structure, but in chemically different CEO molecules different $R^1$ and/or $R^2$ groups are present (but may be the same or different within those other molecules). In other words, each repeat unit in the CEO molecule is identical.

In another preferred form, CEO molecules may contain different $R^1$ and/or $R^2$ groups within the molecule.

The copolymerization of the chemically different CEOs is carried out under the same conditions (for instance temperature, catalyst type and catalyst amount) which are useful for the homopolymerization of CEOs. Such processes are described in U.S. Pat. Nos. 5,039,783, 5,466,744, 5,658,454 and 5,661,214, all of which are hereby included by reference. Before the polymerization is started however the two or more chemically different CEOs present in the process should preferably be reasonably well mixed (usually in the liquid phase) to ensure that a CPE which is reasonably uniform in composition is obtained (if that is what is desired). It is preferred the CPE produced in the process have a number average molecular weight of about 2000 or more, more preferably about 10,000 or more, and especially preferably about 25,000 or more.

Some of the properties of the CPE will be dependent on what repeat units are present and their molar ratio in the CPE, which is in turn dependent on the molar ratio of the various CEOs which were polymerized to form the CPE. For instance copolymerizing a first CEO whose homopolyester is relatively highly crystalline (has a high heat of fusion) and has a relatively high melting point, with a second CEO whose homopolyester is relatively noncrystalline or even amorphous and has a low melting and/or low glass transition temperature could result in a copolyester which was somewhat crystalline (but less than the crystallinity of the first homopolyester), and having a melting point intermediate between that of the first and second homopolyester. Typically these properties of the copolyester will be approximately the weighted (for the molar proportions of each in the copolyester) average of the two homopolyesters. Thus the artisan can control to some extent these and other properties which change with the copolyester composition, an advantage in making polyesters tailored for specific applications.

For example a major use for low viscosity readily polymerizable materials are for coatings and encapsulating (potting) materials. Herein coating differs from encapsulating in that coating involves coating only part of the external surfaces of an object, while encapsulating means coating all of the external surfaces of an object. The object may be part (or a subassembly of) a larger object. For encapsulating, thermosets such as epoxy resins are often used because they often have low viscosities and cure to hard materials. However they have disadvantages such as high moisture absorption and/or brittleness. It has been recognized that CEOs could be used as encapsulating or coating materials, but they too can have disadvantages. For example if they are not highly crosslinked (and they are usually not) polyesters made from typical CEOs often have high melting points and crystallinities so that the encapsulation or coating material has heat resistance. However high crystallinity often means that during the formation and subsequent cooling and crystallization of the polyester the polymer shrinks considerably thereby introducing high stresses and/or pulling away of the polymer from the material being encapsulated or coated. By making CPEs from mixtures of CEOs one can more closely control the crystallinity level and/or melting point of the CPE formed, thereby more closely balancing the needed melting point and/or crystallinity level with the (lack of) shrinkage and heat resistance required for the coating or encapsulation material. Other properties important to particular applications may be similarly balanced by using appropriate combinations of CEOs to make CPEs.

It is preferred that the CPEs which are made as coatings or encapsulants have a melting point which is high enough so that the melting point of the CPE is not exceeded in use. Preferably these melting points will be at least about 80° C., more preferably at least 100° C., especially at about 120° C. and very preferably at least about 150° C. Maximum melting points are preferably about 250° C., more preferably 200° C., and especially preferably about 150° C. Any preferred maximum melting point can be combined with any preferred minimum melting point to form a preferred melting point range. It is also preferred that the heat of fusion of the CPE is at least about 2 J/g, more preferably at least about 5 J/g and very preferably at least about 10 J/g. Maximum heats of fusion are preferably about 20 J/g, more preferably 30 J/g, and especially preferably about 50 J/g. Any preferred maximum heat of fusion can be combined with any preferred minimum heat of fusion to form a preferred heat of fusion range. Any preferred measure of heat of fusion may also be combined with any preferred measure of melting point to further define a preferred CPE. Examples of such polymers are copolymers of terephthalic acid with 1,4-butanediol and diethylene glycol [bis(2-hydroxyethyl) ether] made from cyclic oligomers of (1,4-butylene terephthalate) and (diethylene glycol terephthalate). Such copolymers are made and described in the Examples, and it will be seen that they have the desirable properties of the CPEs desired herein.

All of these copolymers can be made directly in a mold by melting and mixing the CEOs to be copolymerized either before introduction in the mold or in the mold itself, mixing in polymerization catalyst and allowing the polymerization to take place. If encapsulation is being carried out, it may be desirable to place the mold under (partial) vacuum before the CEOs are introduced into the mold.

The CPEs produced in the present process are usually and preferably linear copolyesters. However branched (but not crosslinked) copolyesters can be made by including in the CEOs small amount of tri- or higher functional monomers that can act as branch points to form branched CPEs.

In some instances the CPEs produced by the above copolymerization process have unique microstructures, that is the sequence of repeat units in the CPE is different from such sequences found in copolyesters with the same nominal chemical composition made by other methods. For example probably the most common method of making polyesters is an esterification and/or transesterification reaction in which one or more diacids or their diesters are reacted directly with one or more diols. This reaction, which at first forms (di)esters of the dicarboxylic acid and the diols present, then forms oligomers and finally higher molecular weight polymers, is usually carried out at elevated temperatures and often under vacuum. This type of a polymerization reaction typically results in a random copolymer, wherein the units derived from the dicarboxylic acid(s) (if there is more than one) and/or diols (if there is more than one) are randomly distributed along the polymer chain, see for instance N. Lotti, et al., Polymer, vol. 41, p. 5297–5304 (2000). Block polymers of copolyesters have also been made, but the blocks usually are to a certain extent randomized in block length because the reactions used to form the individual blocks are governed by statistical factors. Assuming no randomization of the CPE chains (as by transesterification reactions) once they are formed, ring opening polymerization of the CEOs as described herein can normally result only in blocks of certain lengths. For example, if two chemically different CEO dimer are represented by the formulas

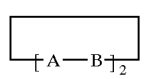 and (II)

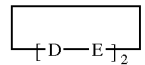

(III)

wherein A and D represent moieties derived from a dicarboxylic acid and B and E represent moieties derived from diols, and A and D and/or B and E are different, then, ignoring end groups, the resulting CPE will have the formula

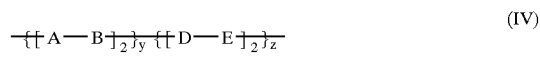

(IV)

wherein y and z are integers of 1 or more. Thus y and z are measures of the consecutive numbers of molecules of (II) and (III), respectively which are polymerized into the CPE at any given point during formation of the CPE. Notice that in this instance blocks of A-B and C-D each must contain an even number of A-B or C-D pairs, respectively, a consequence of the ring opening copolymerization mechanism of the copolymerization process described herein. When unimers are not present in at least one of the chemically different CEOs to be copolymerized a CPE with a structure different from a random CPE is made, since if unimers of a certain CEO are not present, "single repeat unit blocks" of that CEO composition are not present in the polymer (by "are not present" means less than 1 mole percent of the total blocks (blocks of all repeat units) are present as single repeat unit blocks). By a "single repeat unit block" in this instance is meant [for example for (IV)] a single repeat unit of A-B or C-D. More preferably less than 2 mole percent of single repeat unit blocks, especially preferably less than 5 mole percent of the single repeat unit blocks is present. Other analogous unique microstructures with CEOs of various ring sizes (dimer, trimers, etc.) will be evident to the artisan. Single repeat unit blocks can be determined by NMR, or if they are present in small quantitites, by calculation assuming the ring opening polymerization of the CEOs are random.

Another method of measuring the microstructure of such CPEs is the so-called "degree of randomness", see for instance M. S. Chen, et al., J. Appl. Polym. Sci., vol. 40, p. 1053–1057 (1990), and N. Lotti, et al., Polymer, vol. 41, p. 5297–5304 (2000), both of which are hereby included by reference. These are experimentally determined by measuring by NMR the relative molar amounts (which are proportional to their NMR signal intensities) of nearest neighbors for each type of repeat unit. For instance in a copolyester containing a single diacid "A", and two different diols "B" and "C", one can measure the NMR signal intensities ($I_{XXX}$) due to the sequences BAB, CAC and BAC. In this, $I_{BAC}$ must equal $I_{CAB}$. One can then calculate:

$P_{CA} = I_{CAB}/(I_{CAB} + I_{CAC})$;

$P_{AC} = I_{BAC}/(I_{BAC} + I_{BAB})$; and then $b = P_{CA} + P_{AC}$

In this calculation "b" is the degree of randomness. More details are found in the above mentioned references.

One can calculate that the random copolymerization of equimolar amounts of two chemically different CEO dimers leads to an CPE have a degree of randomness of 0.80, while a similar copolymerization with two trimers gives a degree of randomness of 0.57, two tetramers 0.44, two pentamers 0.36, etc., all assuming no randomization of the CPE by later transesterification reactions. It is noted that similar values can be calculated for mers of different sizes in the same copolymerization. Thus the present copolymerization of chemically different CEOs can yield CPEs with degrees of randomness of about 0.20 to 0.85, more preferably about 0.30 to about 0.80, depending on the CEOs chosen as the starting material. As described by these two references a totally random copolyester has a degree of randomness of 1.0.

Herein melting points and glass transition temperatures are measured using ASTM Method D3418. Melting points are taken as the maximum of the melting endotherm, and glass transition temperatures are taken as the midpoint of the transition. Melting points and glass transition temperatures are measured on the second heat, using a heating rate of 10° C./min, and a cooling rate (between first and second heats) of 10° C./min. If more than one melting point is present the melting point of the CPE is taken as the highest of the melting points, but the heats of fusion of all the melting points are added to obtain the heat of fusion of the CPE.

In the Examples, CPEOT was obtained as described in A. Lavalette, et al., Biomacromolecules, vol. 3, p. 225–228 (2002), and CPBT was obtained from Cyclics Corp., Schenectady, N.Y., U.S.A., and was purified. CPEOT is the cyclic ester dimer of terephthalic acid and diethylene glycol (2 molecules of terephthalic acid and ethylene glycol per molecule), and CPBT is a mixture of the cyclic ester dimer and trimer of terephthalic acid and 1,4-butanediol. The systematic name for CPEOT is 3,6,9,16,19,22-hexaoxatricyclo[22.2.2.211,14]triaconta-11,13,24,26,27,29-hexaene-2,10,15,23-tetrone, and the systematic name for CPBT is 3,8,15,20-tetraoxatricyclo[20.2.2.210,13]octacosa-10,12,22,24,25,27-hexaene-2,9,14,21-tetrone-3,8,15,20,27, 32-hexaoxatetracyclo[32.2.2.210,13.222,25]dotetraconta-10,12,22,24,34,36,37,39,41-nonaene-2,9,14,21,26,33-hexone.

EXAMPLES 1–3 and COMPARATIVE EXAMPLES A–B

A typical procedure was:

A 125 ml Erlenmeyer flask was charged with 7.5 g CPEOT (0.03 mole), and 7.5 grams of CPBT (0.03 mole) and a small magnetic stirrer. The Erlenmeyer flask was placed in a hot oil bath. The temperature of the oil bath was maintained at 230° C. using a temperature controller. After all of the CEOs had melted, 0.045 g (0.00018 mole) of butyltin chloride dihydroxide (CAS# 13355-96-9, FAS-CAT® 4101 from Elf-Atochemie) was added to the stirred melt. After 17 min the viscosity had increased to the point where all stirring had stopped. The oil bath temperature was maintained at 230° C. for an additional 30 min. The Erlenmeyer flask was removed and the reaction mixture allowed to cool to room temperature. The solid polymer was analyzed by Differential Scanning Calorimetry (DSC) and had a melting point of 150.16° C., indicating that a copolymer had been formed from the mixture of CEOs. The Inherent Viscosity (IV) (methylene chloride-trifluoroacetic acid solution, Goodyear R-103B Equivalent IV Method) of the CPE was 0.447 dL/gm.

Conditions and results of these examples are given in Table 1. $\Delta H_f$ is heat of fusion.

TABLE 1

| Ex. | CPEOT, g | CPBT, g | IV | Tm, oC | ΔH, J/g f |
|---|---|---|---|---|---|
| A | 15.00 | 0.00 | 0.268 | — | — |
| 1 | 11.25 | 3.75 | 0.233 | 191.21 | 7.057 |
| 2 | 7.50 | 7.50 | 0.447 | 150.16 | 17.59 |
| 3 | 3.75 | 11.25 | 0.969 | 188.03 | 14.88 |
| B | 0.00 | 15.00 | 1.654 | 215.44 | 19.67 |

What is claimed is:

1. A process for the copolymerization of cyclic ester oligomers, comprising, contacting under ring opening polymerization conditions a mixture of two or more molten chemically different cyclic ester oligomers of the formula

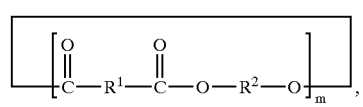

(I)

with a catalyst for the ring opening polymerization of cyclic ester oligomers, to form a copolyester, wherein:
   $R^1$ and $R^2$ are each independently hydrocarbylene or substituted hydrocarbylene; and
   m is an integer of 1 or more; and
   provided that when every $R^1$ in each molecule of cyclic ester oligomer is not the same and/or every $R^2$ in each molecule of cyclic ester oligomer is not the same, at least two of the chemically different cyclic ester oligomers present are at least 15 mole percent to total amount of cyclic ester oligomers present.

2. The process as recited in claim 1 wherein in each cyclic ester oligomer $R^1$ and $R^2$ are the same.

3. The process as recited in claim 1 or 2 wherein at least one of said chemically different cyclic ester oligomers are derived from:
   (a) a diol component selected from the group consisting of diols of the formula $HOCH_2(CR^3R^4)_qCH_2OH$ or $HO(CH_2CH_2O)_tH$ wherein $R^3$ and $R^4$ are each independently hydrogen or alkyl, and q is 0 or an integer of 1 to 10, or t is an integer of 2 to 20, hydroquinone, and bisphenol-A, and combination thereof; and
   (b) a dicarboxylic acid component selected from the group consisting of compounds of the formula $HO_2C(CH_2)_nCO_2H$ wherein n is an integer of 1 to 10, isophthalic acid, substituted isophthalic acids, terephthalic acid, substituted terephthalic acids, and 2,6-naphthalenedicarboxylic acid, and combinations thereof.

4. The process as recited in claim 1 or 2 wherein at least one of said chemically different cyclic ester oligomers are derived from a combination of:
   terephthalic acid with diethylene glycol, ethylene glycol, 1,3-propanediol, 1,4-butanediol, 1,5-pentanediol, and 1,6-hexanediol or a mixture thereof;
   isophthalic acid with diethylene glycol, ethylene glycol, 1,3-propanediol, 1,4-butanediol, 1,5pentanediol, and 1,6-hexanediol or a mixture thereof; or
   one or both of succinic and adipic acids with one or more compounds of the formula $HOCH_2(CR^3R^4)_nCH_2OH$, wherein $R^3$ and $R^4$ are hydrogen or alkyl containing 1 to 4 carbon atoms and n is 0 or an integer of 1 to 10.

5. The process as recited in claim 1 wherein every $R^1$ and every $R^2$ in each molecule of cyclic ester oligomer are not the same, at least two of the chemically different cyclic ester oligomers present are at least 20 mole percent of said total amount of said cyclic ester oligomers present.

6. The process as recited in claim 1 wherein a polymerization catalyst is present.

7. A process for encapsulating or coating an object, comprising, contacting said object with a molten mixture of two or more chemically different cyclic ester oligomers and copolymerizing said molten mixture to form a copolyester which encapsulates or coats said object.

8. The process as recited in claim 7 wherein repeat units within each molecule of cyclic ester oligomer are identical.

9. The process as recited in claim 7 or 8 at least one of said chemically different cyclic ester oligomers are derived from:

(a) a diol component selected from the group consisting of diols of the formula $HOCH_2(CR^3R^4)_qCH_2OH$ or $HO(CH_2CH_2O)_tH$ wherein $R^3$ and $R^4$ are each independently hydrogen or alkyl, and q is 0 or an integer of 1 to 10, or t is an integer of 2 to 20, hydroquinone, and bisphenol-A, and combination thereof; and (b) a dicarboxylic acid component selected from the group consisting of compounds of the formula $HO_2C(CH_2)_nCO_2H$ wherein n is an integer of 1 to 10, isophthalic acid, substituted isophthalic acids, terephthalic acid, substituted terephthalic acids, and 2,6-naphthalenedicarboxylic acid, and combinations thereof.

10. The process as recited in claim 8 or 9 wherein at least one of said chemically different cyclic ester oligomers are derived from a combination of:

terephthalic acid with diethylene glycol, ethylene glycol, 1,3-propanediol, 1,4-butanediol, 1,5-pentanediol, and 1,6-hexanediol or a mixture thereof;

isophthalic acid with diethylene glycol, ethylene glycol, 1,3-propanediol, 1,4-butanediol, 1,5pentanediol, and 1,6-hexanediol or a mixture thereof; or one or both of succinic and adipic acids with one or more compounds of the formula $HOCH_2(CR^3R^4)_nCH_2OH$, wherein $R^3$ and $R^4$ are hydrogen or alkyl containing 1 to 4 carbon atoms and n is 0 or an integer of 1 to 10.

11. The process as recited in claim 9 wherein two different cyclic ester oligomers are present, and a first cyclic ester oligomer is derived from terephthalic acid and diethylene glycol, and a second cyclic ester oligomer is derived from terephthalic acid and 1,4-butanediol.

12. The process as recited in claim 8 wherein said copolyester has a melting point of about 100° C. to about 200° C. and a heat of fusion of about 5 J/g to about 50 J/g.

13. A copolyester with a degree of randomness of about 0.20 to 0.85.

14. The copolyester as recited in claim 13 wherein said degree of randomness is about 0.30 to about 0.80.

15. The copolyester as recited in claim 13 wherein single repeat units are less than 5 mole percent of all repeat unit blocks.

16. The copolyester as recited in claim 13 wherein single repeat units are not present.

17. A copolyester wherein single repeat unit blocks are not present.

18. The copolyester as recited in claim 17 which has a degree of randomness of about 0.20 to 0.85.

* * * * *